United States Patent
Walk

(10) Patent No.: US 11,890,563 B2
(45) Date of Patent: Feb. 6, 2024

(54) GRID COVER FOR FILTER SYSTEM

(71) Applicant: Walk Industrial, Inc., Murrieta, CA (US)

(72) Inventor: Tyler G Walk, Mattoon, IL (US)

(*) Notice: Subject to any disclaimer, the term of this patent is extended or adjusted under 35 U.S.C. 154(b) by 752 days.

(21) Appl. No.: 16/780,759

(22) Filed: Feb. 3, 2020

(65) Prior Publication Data

US 2020/0276530 A1    Sep. 3, 2020

Related U.S. Application Data

(60) Provisional application No. 62/799,748, filed on Feb. 1, 2019.

(51) Int. Cl.
*B01D 46/00* (2022.01)
*F16B 2/22* (2006.01)
*B05B 12/32* (2018.01)

(52) U.S. Cl.
CPC ......... *B01D 46/0004* (2013.01); *B05B 12/32* (2018.02); *F16B 2/22* (2013.01); *B01D 2201/313* (2013.01); *B01D 2265/028* (2013.01)

(58) Field of Classification Search
None
See application file for complete search history.

(56) References Cited

U.S. PATENT DOCUMENTS

| | | | | |
|---|---|---|---|---|
| 2,740,179 A * | 4/1956 | Flora | ................. | F16B 5/06 24/690 |
| 3,466,710 A * | 9/1969 | Kupersmit | ............. | B65D 45/16 229/125.21 |
| 3,792,593 A * | 2/1974 | Loos | ................. | F24F 1/027 62/262 |
| 5,512,074 A * | 4/1996 | Hanni | ................. | B01D 46/58 55/497 |
| 5,513,996 A * | 5/1996 | Annerino | ................. | H02B 1/16 439/95 |
| 5,595,416 A * | 1/1997 | Horwill | ................. | B62D 35/005 24/535 |
| 6,250,789 B1 * | 6/2001 | Hess | ................. | F21V 17/101 362/546 |
| 8,105,409 B2 * | 1/2012 | Mann | ................. | B01D 46/58 55/501 |
| 9,669,337 B2 * | 6/2017 | Giasson | ................. | B01D 33/067 |
| 10,434,449 B1 * | 10/2019 | Coupal | ................. | B01D 46/58 |
| 10,512,865 B2 * | 12/2019 | Eyers | ................. | F02C 7/055 |
| 10,675,580 B1 * | 6/2020 | Wyluda | ................. | B01D 46/0005 |
| 10,758,857 B2 | 9/2020 | Walk et al. | | |
| 11,633,681 B2 * | 4/2023 | Grace | ................. | B01D 35/02 55/497 |
| 2006/0080933 A1 * | 4/2006 | Robicheau | ........... | H02G 3/0456 52/712 |
| 2007/0094994 A1 * | 5/2007 | Singleton | ................. | E04F 13/00 52/698 |
| 2010/0251678 A1 * | 10/2010 | Mann | ................. | B01D 46/121 55/483 |

(Continued)

FOREIGN PATENT DOCUMENTS

WO   WO-2016141453 A1 *  9/2016  ............ B01D 33/06
WO   WO-2021173945 A1 *  9/2021  ......... B01D 33/0061

*Primary Examiner* — Brit E. Anbacht
(74) *Attorney, Agent, or Firm* — Stinson LLP

(57) ABSTRACT

A grid cover for a grid of a filter system covers a strut of the grid. The grid cover may be removable. The grid cover may be configured as a clip and may be clipped on the strut of the grid.

12 Claims, 5 Drawing Sheets

(56) References Cited

U.S. PATENT DOCUMENTS

| | | | |
|---|---|---|---|
| 2018/0221801 A1* | 8/2018 | Eyers | F02C 7/055 |
| 2018/0345193 A1* | 12/2018 | Graves | B01D 46/0004 |
| 2020/0246733 A1* | 8/2020 | Grace | B01D 35/02 |
| 2020/0368660 A1* | 11/2020 | Snell | B01D 46/0005 |
| 2021/0262695 A1* | 8/2021 | Wu | F24F 13/28 |
| 2021/0268410 A1* | 9/2021 | Townson | B01D 33/067 |

\* cited by examiner

GRID COVER FOR FILTER SYSTEM

FIELD OF THE DISCLOSURE

The present disclosure generally relates to a grid cover for a filter system, the filter system including the grid cover, and a method of assembling the filter system.

BACKGROUND OF THE DISCLOSURE

Filters are used to remove particulates from a flow of fluid. In one example, filters may be used in a ventilation system for the removal of oversprayed coatings (e.g., paint, stain, powder) from the air, such as in a paint booth. As shown in FIG. 1, the filter system 10 (e.g., a filter wall) may include filters 12 arranged on a structural grid 14 (e.g., a vertical grid) which support/hold the filters in place. The structural grid 14 includes a lattice of struts or frame members, such as metal struts, secured to one another to define openings in which the filters 12 are received. In one example, the metal struts comprise angle irons.

Over time, the structural grid 14, e.g., the struts, accumulate large amounts of unwanted product such as paint, glue, sealer, and many other sprayed particulates. These unwanted particulates on the grid 14 are traditionally removed with a brass putty knife or plastic scraper. This process is very time consuming and labor intensive. Removing the product from the grid 14 can result in broken fingers, hands, and even wrists due to the difficulty in loosening the filters from the densely coated areas during extraction. Cuts and abrasions also occur regularly from the removal device or the grid 14 itself. This can result in downtime, doctor and nurse visits, stitches, casts, and possible worker compensation. Removal of this unwanted product has also been known to cause thermal events/fires due to sparks or heat buildup during removal. There are other methods of clearing the residue, such as using dry ice, sand blasting, or chemical dipping, however, these processes can be very expensive and time consuming.

SUMMARY OF THE DISCLOSURE

In one aspect, a filter system generally comprises at least one support strut defining an opening. A filter is received in the opening defined by the support strut and is supported by the at least one strut. A grid cover overlies at least a portion of said at least one support strut and is disposed between said at least one support strut and the filter. The strut cover is removable from said at least one support strut.

In another aspect, a method of assembling a filter system generally comprises placing a filter in an opening defined by a support grid, wherein the support grid includes struts; and placing a strut cover on the support grid, such that when the filter is placed in the opening an arm of the strut cover is sandwiched between the filter and at least one of the struts and a front wall of the strut cover is adjacent a front side of the filter.

In yet another aspect, a grid cover for a grid of a filter system generally comprises a front wall; and a pair of opposing arms extending rearward from the front wall. The pair of opposing arms are configured to clip onto a strut of the grid and be disposed between the strut and adjacent filters received in adjacent openings of grid.

DETAILED DESCRIPTION OF THE DISCLOSURE

Figure 1:
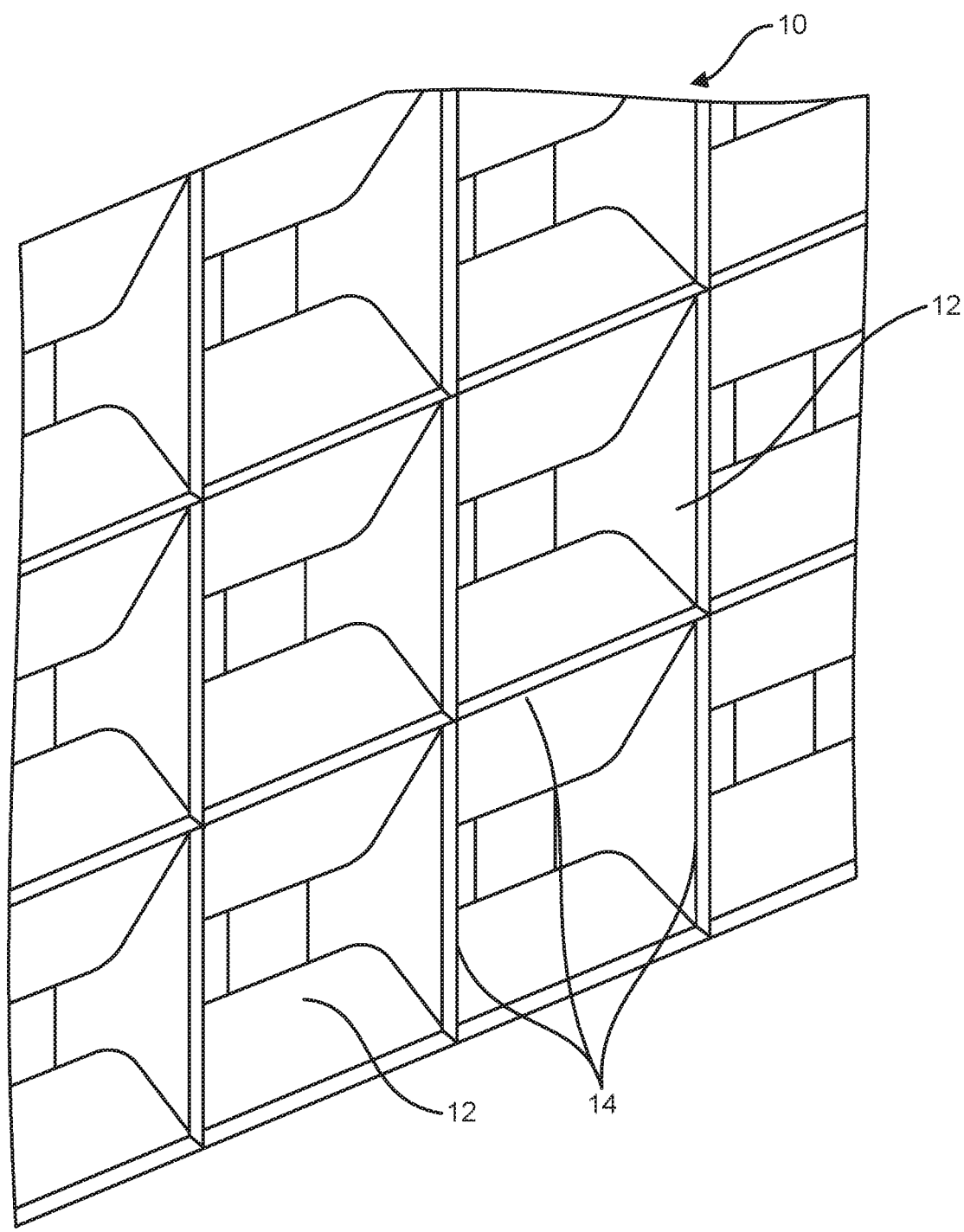
FIG. 1 is a partial perspective of a conventional filter system including a structural grid and filters in openings of the structural grid.
Figure 2:
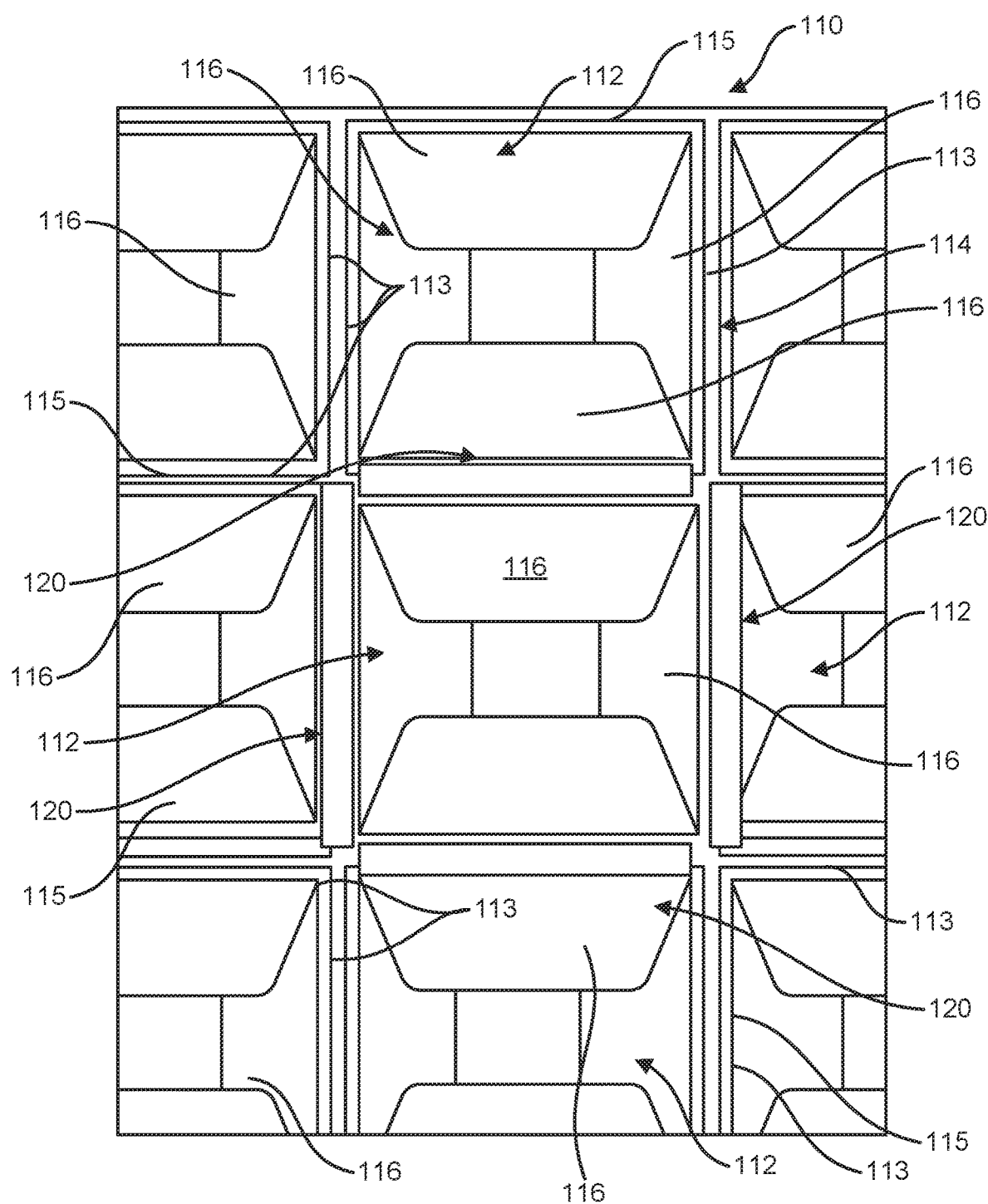
FIG. 2 is a partial front elevation of a filter system of the present disclosure including grid covers constructed according to the teachings of the present disclosure.

Referring to FIG. 2, an illustrated embodiment of a filter system constructed according to the teachings of the present disclosure is generally indicated at reference numeral 110. The illustrated filter system 110 is similar to the filter system 10 shown in FIG. 1. The filter system includes filters 112, and a structural grid 114 including a plurality struts 113 (or frame members) secured to one another to define a lattice having openings in which the filters are received. The struts 113 may be formed from metal or other rigid material. In one example, the struts 113 comprise angle irons. The openings defined by the illustrated struts 113 are rectangular (or square) shaped openings, although the openings may have other shapes, such as other polygonal shapes (e.g., hexagonal, octagonal, etc.), circular, oval, elliptical, or other shapes. Each of the illustrated filters 112 includes an open front 115 and at least one filter wall extending rearward from the front of the filter and defining an interior 108 in which particulate-laden air flows. The filter wall 116 includes a filter material or media suitable for filtering particulate from the particulate-laden air, such as but not limited to polyester, thermal or resin bonded polyester, polypropylene, polyurethane, polyethylene, polyethylene foam, polyurethane foam, polyphenylene sulfide, polyolefin plastic, coal, glass, micro glass, spun glass, animal hair, organic fiber, fiberglass, acrylic fiber, paper, paper poly, cotton, nylon, Teflon, Aramid, felt, metal, fiber blend, wood, plastic, cardboard, or any combination thereof. The front 115 of the filter 112 may include a generally rigid frame configured to hold open the front of the filter. Suitable filters 112 are described in U.S. application Ser. No. 15/978,386, filed May 14, 2018, the entirety of which is hereby incorporated by reference. The filter may be of another design and/or construction without necessarily departing from the scope of the present disclosure. For example, other suitable filters defining an interior for use with spray booths are generally known art, and may be generally known as bag filters or pocket filters. In addition, other suitable filters may be planar and may not define an interior, and may be generally known as pad filters.

The difference between the conventional filter system 10 and the illustrated filter system 110 is that the filter system 110 further includes grid covers, generally indicated at 120 thereinafter also referred to as a cover, an illustrated cover, grid clip, or clip), secured to and covering or overlying the grid 114 (e.g., struts 113) between adjacent filters 112. Each grid cover 120 extends along the length or lengths of a corresponding strut or struts 113 and covers or overlies a majority of a length of the strut (or lengths of struts), preferably, greater than 90% or between 90% and 95% or substantially an entirety of the length(s) of the strut(s). In this way, the grid covers 120 inhibit particulate from forming on the face of the grid (e.g., on the struts). The covers 120 may also inhibit overspray bypass due to gaps or openings between the filters 112 and the struts 113. In one example the clips 120 are removable from the structural grid 114 to allow the filters 112 to be removed and replaced. The material that accumulates on the covers 120 can be made be easily removable. Users can be given the option to do so by twisting, pounding, heating, scraping, brushing or chemical dipping the clip 120 in order to remove unwanted build-up for re-use. The cover 120 may be intended to be reused, but can also be a disposable, one-time use item as well. The illustrated cover 120 has a generally linear shape configured to secure to a single grid strut. It is understood that the cover may be securable to more than one grid strut, such as one or more struts defining the opening of the grid in which the filter is received. Moreover, the cover may have other shapes, including but not limited to circular, semi-circular, polygonal (e.g., hexagonal, octagonal, etc.), a portion of a polygon, or other shapes.

Figure 3:
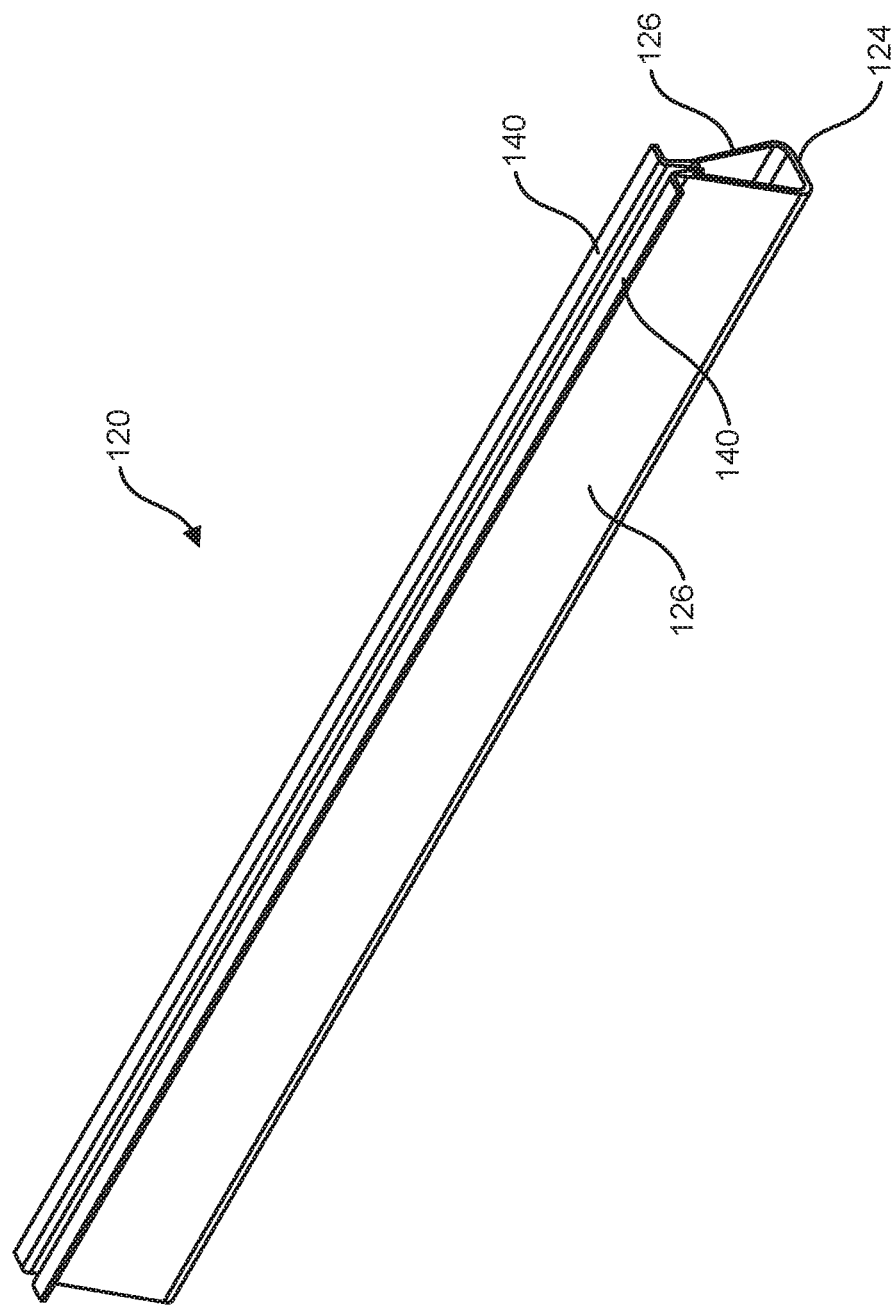
FIG. 3 is a perspective of one of the grid covers in FIG. 2.
Figure 4:
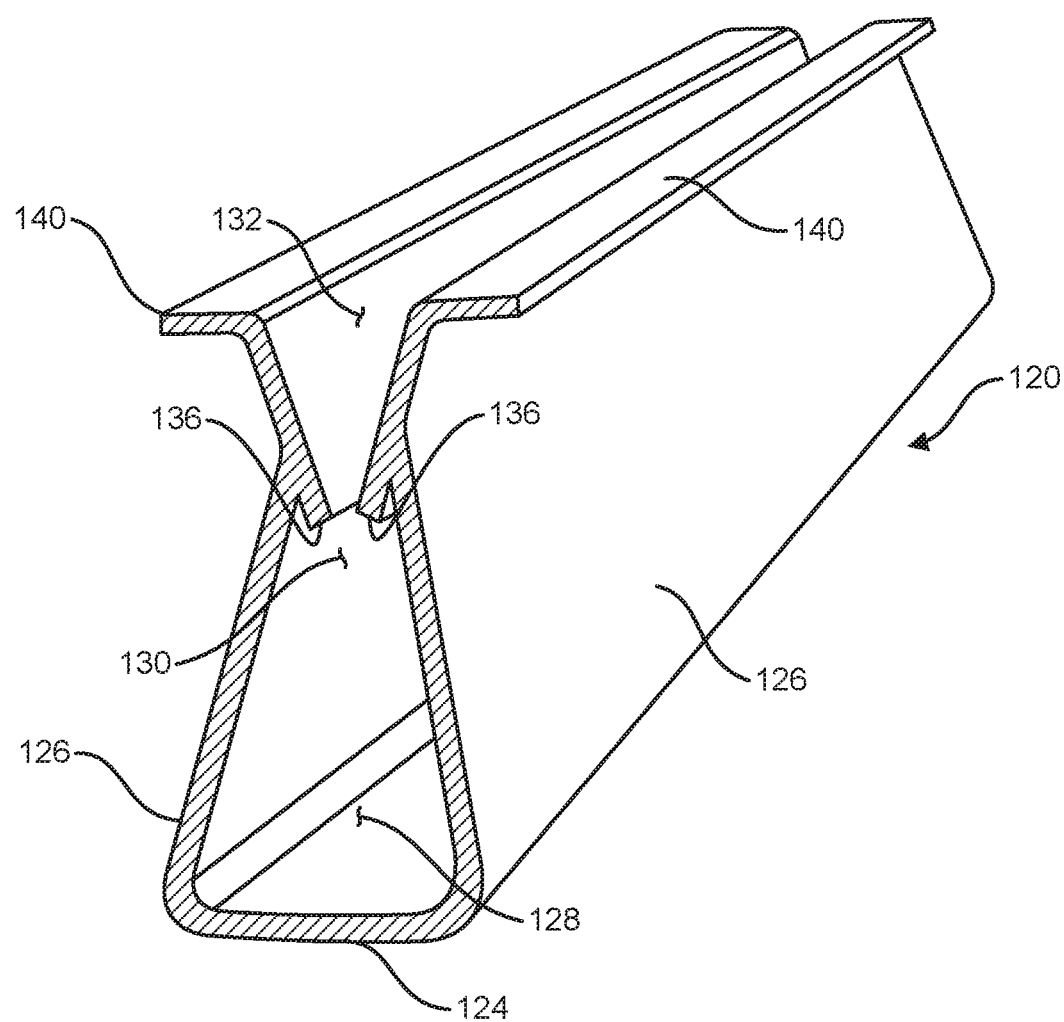
FIG. 4 is an enlarged, cross-sectional perspective of the grid cover.
Figure 5:
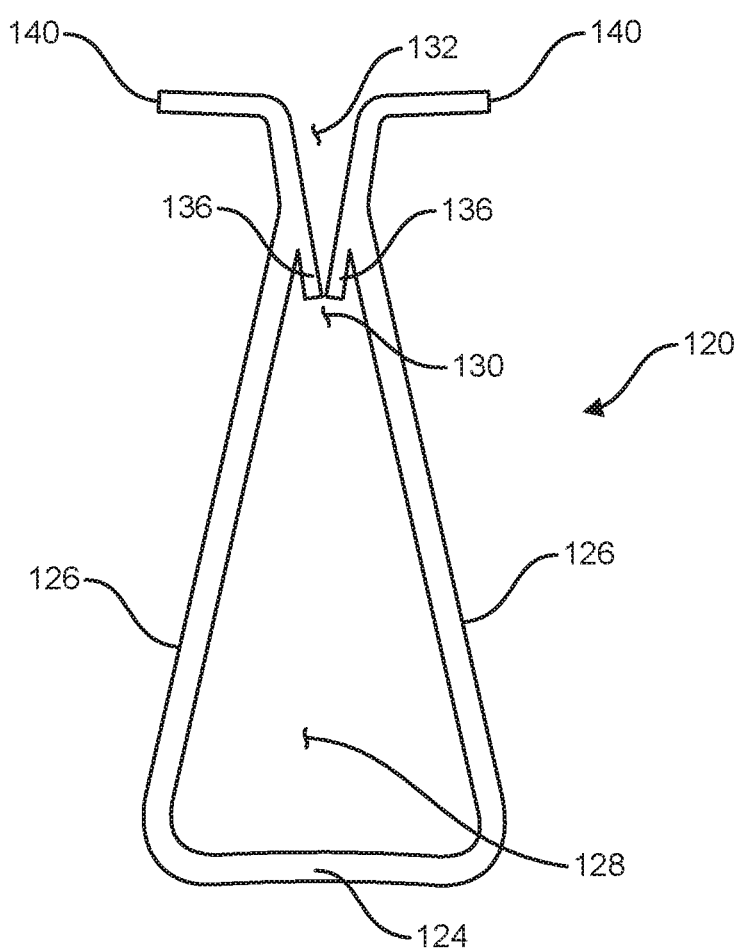
FIG. 5 is a side elevation of the grid cover.

Referring to FIG. 3-5, the grid cover 120 has a generally channel shape, including a front wall 124 (or base) and two opposing arms 126 extending rearward from the front wall to define an interior 128 sized and shaped to receive the grid strut 113 (e.g., the front leg of an L-shaped strut or angle iron) therein. When received on the grid strut 113, the arms 126 of the grid cover 120 are disposed between the filter 112 and the corresponding grid strut 114. In this manner, the grid covers 120 may act as shims between the filters 112 and the grid 114 to stabilize the filters 112 when they have large amounts of product on them or inadequate air flow and they become very heavy. Currently, substantial by-product or incorrect filter installation can cause the filters 112 to move/shift, creating hazards affecting environmental damage, build-up onto other parts of the booth system, air quality, and fires, amongst others. It can also cause the filters 112 to curl over or dog ear, which allows direct bypass into the environment or into another stage of filtration.

The illustrated grid cover 120 is configured as a grid clip (referred to by the same reference numeral 120) that is readily securable (e.g., clipped onto) to the grid 114. The grid clip 120 may also be removable from the grid 114 and may be reusable or disposable. The opposing arms 126 extend from the front wall 124 at an inward angle so that they project toward one another to define a general V-shape and a throat portion 130 of the interior 128. The opposing arms 126 flare away from one another from adjacent the throat portion 130 to an open back side of the clip 120 to define a mouth portion 132 of the interior 120. The open back side of the clip 120 is sized and shaped to slidably receive the grid strut 113 (e.g., the front leg of the L-shaped strut or angle iron) into the mouth portion 132 of the interior 128 of the clip 120 so that the arms 126 cover at least a portion (e.g., the front leg of the L-shaped strut or angle iron) of the strut. Interior detents 136 (e.g., barbs) are disposed in the interior 128 of the clip 120, such as generally adjacent the throat portion 130, and project forward toward the front wall 124. One or both of the arms 126 are resiliently deflectable (e.g., cantilevered) relative to the front wall 124 as the strut 113 enters the throat 130 of the interior 128 to expand the throat such that the arm(s) 126 apply a spring or biasing force to the strut (e.g., front leg of the L-shaped strut or angle iron) to retain the clip on the strut. The interior detents 136 engage the strut 113, and the spring or biasing force is applied through detents to further facilitate retention of the clip 120 on the strut. Rear flanges 140 project outward from the arms 126 at the back side of the clip 120. The flanges 140 may engage and cover a rear wall of the strut 113 (e.g., rear wall of the L-shaped strut or iron angle).

The clip 120 may comprise plastic, such as high temperature plastic that does not deform when placed in an oven to remove accumulated material. The plastic may also be durable, e.g., high impact. A suitable material is PVC, although other material may be used.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A filter system comprising:
at least one support strut defining an opening;
a filter received in the opening defined by the at least one support strut and being supported by the at least one support strut; and
a grid cover comprising a front wall and a pair of opposing arms extending rearward from the front wall at an inward angle, wherein the opposing arms project inward towards each other from the front wall, wherein the pair of opposing arms of the grid cover overlie at least a portion of said at least one support strut and are disposed between said at least one support strut and the filter, wherein the grid cover is removable from said at least one support strut,
wherein the front of the filter engages one of the pair of opposing arms of the grid cover such that the grid cover functions as a shim between the filter and the support strut.

2. The filter system set forth in claim 1, wherein said at least one support strut comprises a plurality of support struts secured to one another, wherein the opening defined by the plurality of support struts comprises a plurality of openings, wherein the filter comprises a plurality of filters received in the plurality of openings, wherein the grid cover comprises a plurality of grid covers.

3. A method of assembling a filter system comprising:
placing a filter in an opening defined by a support grid, wherein the support grid includes a plurality of struts; and
placing a grid cover on the support grid, such that an arm of the grid cover extends at an inward angle and is sandwiched between the filter and at least one of the plurality of struts, and a front wall of the grid cover is adjacent a front side of the filter, wherein a front of the filter engages the arm of the grid cover such that the grid cover functions as a shim between the filter and the support strut.

4. The method of assembling a filter system set forth in claim 3, wherein said placing a grid cover on the support grid comprises removably securing the grid cover to said at least one of the plurality of struts.

5. A grid cover for a grid of a filter system, the grid including a plurality of struts defining adjacent openings in which adjacent filters are received, the grid cover comprising:
a front wall; and a pair of opposing arms extending rearward from the front wall at an inward angle, wherein the opposing arms project inward towards each other from the front wall, and wherein the pair of opposing arms are configured to clip onto one of the plurality of struts of the grid and be disposed between the one of the plurality of struts and the adjacent filters received in the adjacent openings of the grid, wherein the opposing arms project rearward and inward towards each other from the front wall to define an interior sized and shaped to receive the one of the plurality of struts of the grid, wherein the pair of opposing arms are configured to engage the fronts of the adjacent filters such that the grid cover functions as a shim between the filters and the support strut.

6. The grid cover of claim 5, wherein the interior includes a throat portion and a mouth portion, wherein the opposing arms flare away from one another adjacent the throat portion to define the mouth portion.

7. The grid cover of claim 5, wherein the two opposing arms comprises detents disposed in the interior to engage the strut.

8. The grid cover of claim 5, further comprising rear flanges projecting outward from the opposing arms, wherein the rear flanges are configured to engage at least a portion of the one of the plurality of struts.

9. The grid cover of claim 5, wherein the opposing arms each comprise a detent having an inward portion projecting inward and towards the front wall and an outward portion extending outward and away from the front wall.

10. The grid cover of claim 9, wherein the opposing arms each comprise a flange portion ending from the outward portion of detent, wherein the flange portion and the front wall are planar.

11. The filter system of claim 1, wherein the front of the filter defines an opening and includes a generally rigid frame configured to hold open the front of the filter.

12. The method of claim 3, wherein a front of the filter defines an opening and includes a generally rigid frame configured to hold open the front of the filter.

\* \* \* \* \*